US009981409B2

United States Patent
Nabuurs

(10) Patent No.: US 9,981,409 B2
(45) Date of Patent: May 29, 2018

(54) FORMING DEVICE FOR THERMOFORMING COMPONENTS

(71) Applicant: Nabuurs Developing S.L., Moncada (ES)

(72) Inventor: Antonius Henricus Bernardus Nabuurs, Godella (ES)

(73) Assignee: Nabuurs Developing S. L., Moncada (ES)

( * ) Notice: Subject to any disclaimer, the term of this patent is extended or adjusted under 35 U.S.C. 154(b) by 0 days. days.

(21) Appl. No.: 15/223,069

(22) Filed: Jul. 29, 2016

(65) Prior Publication Data
US 2017/0028592 A1 Feb. 2, 2017

(30) Foreign Application Priority Data
Jul. 31, 2015 (DE) .................. 10 2015 112 641

(51) Int. Cl.
| | |
|---|---|
| *B29B 13/02* | (2006.01) |
| *B29C 51/42* | (2006.01) |
| *B29C 35/02* | (2006.01) |
| *B29C 35/04* | (2006.01) |
| B29L 31/00 | (2006.01) |
| B29L 31/44 | (2006.01) |

(Continued)

(52) U.S. Cl.
CPC ............ *B29C 35/02* (2013.01); *B29C 35/045* (2013.01); *B29C 51/424* (2013.01); *B29B 13/023* (2013.01); *B29C 51/10* (2013.01); *B29C 51/28* (2013.01); *B29C 2035/046* (2013.01); *B29C 2791/006* (2013.01); *B29L 2031/44* (2013.01); *B29L 2031/7692* (2013.01); *B29L 2031/7698* (2013.01)

(58) Field of Classification Search
CPC . B29C 35/045; B29C 2035/046; B29C 51/10; B29C 51/421; B29C 51/424; B29C 51/425; B29B 13/023
See application file for complete search history.

(56) References Cited

U.S. PATENT DOCUMENTS

| | | | |
|---|---|---|---|
| 3,048,383 A | 8/1962 | Champlin | |
| 3,146,143 A | 8/1964 | Bolesky et al. | |

(Continued)

FOREIGN PATENT DOCUMENTS

| | | |
|---|---|---|
| DE | 297 13 665 U1 | 2/1999 |
| EP | 0 450 482 A2 | 10/1991 |

(Continued)

*Primary Examiner* — James P Mackey
(74) *Attorney, Agent, or Firm* — Gudrun E. Huckett

(57) ABSTRACT

A forming device has a machine frame and a forming apparatus disposed on the machine frame. At least one heating chamber is disposed on the machine frame. A heatable support is received in the at least one heating chamber in a position of use for preheating semi-finished products and can be moved in a movement direction out of the at least one heating chamber into a removal position for removal of preheated semi-finished products from the support. In the removal position, the support is at least partially located adjacent to the machine frame and enables access to preheated semi-finished products. At least one heating device is associated with the at least one heating chamber and has one or more convection heating devices that discharge at least one directable heating air flow.

14 Claims, 8 Drawing Sheets

(51) Int. Cl.
  *B29C 51/10* (2006.01)
  *B29C 51/28* (2006.01)

(56) References Cited

U.S. PATENT DOCUMENTS

| | | | |
|---|---|---|---|
| 3,258,813 A | | 7/1966 | Groth et al. |
| 3,319,295 A | | 5/1967 | Jones-Hinton et al. |
| 3,624,806 A | | 11/1971 | Lytzen |
| 5,468,139 A | | 11/1995 | Stender |
| 5,882,569 A | | 3/1999 | Maes |
| 6,443,721 B1 | | 9/2002 | Anderson et al. |
| 7,045,086 B2 | * | 5/2006 | Fitzell, Jr. ............. B29C 51/261 156/245 |
| 2004/0076706 A1 | | 4/2004 | Walther |
| 2006/0233908 A1 | | 10/2006 | La Sorda |
| 2007/0145039 A1 | * | 6/2007 | Nevin ................... B29C 51/421 219/543 |

FOREIGN PATENT DOCUMENTS

| | | |
|---|---|---|
| FR | 2421719 | 11/1979 |
| FR | 2458372 | 1/1981 |

* cited by examiner

FORMING DEVICE FOR THERMOFORMING COMPONENTS

BACKGROUND OF THE INVENTION

The invention relates to a forming device for thermoforming components provided in particular as thermoformable semi-finished products, in particular in the form of plate-shaped or panel-shaped plastic materials, mineral materials or the like, that are configured such that bathtubs, shower bases, kitchen sinks, bathroom sinks, vanities, cover panels, face plates, furniture parts, counter tops, or similar products can be produced from them. The forming device comprises in the area of a machine frame a forming apparatus, preferably comprising a vacuum membrane press, and a support which is heatable in a position of use on the machine frame for preheating the semi-finished products and is in particular in the form of a movable drawer that, for removing the preheated semi-finished products, can be moved into a removal position that is at least partially adjacent to the machine frame.

In connection with a vacuum deep drawing method according to U.S. Pat. No. 3,146,143, a device is known in which the workpieces are applied onto a support material in a closable chamber that can be evacuated. DE 297 13 665 U1 discloses a device for thermoforming of plastic films wherein the device comprises a heating device by means of which during forming the plastic film can be heated. In the vacuum forming method according to U.S. Pat. No. 3,319,295, a film is softened by heating and is shaped in the heated state.

EP 0 450 482 A2 discloses a combined device in which a heating station with two heating plates is provided. Prior to a forming process in the area of the heating station, the components that are present as semi-finished products are received in an additional forming station and are pressed by an upper mold and a lower mold. Based on this method with an additional forming station, in a construction according to US 2004/0076706 A1 it is provided that the forming station embodied as a heating device with two plate-shaped heating elements for preheating the material to be formed is arranged below the vacuum forming device. Accordingly, the system that is disclosed in EP 0 450 482 A2 and comprises two adjacently positioned devices is now combined on one machine frame. Here, the plate-shaped heating elements for preheating are combined with a drawer. In the area of the drawer, an open system is formed in which non-uniform heating of the semi-finished products located between the heating plates may occur.

The invention concerns the problem of providing a forming device for thermoforming of components which, in the area of a support with a heating zone, provided for receiving the semi-finished products that are prepared for processing, provides an energy-saving preheating with improved heating power, wherein, in this context, the useable space that is available in the area of the support enables receiving size-variable semi-finished products in uniformly heatable heating zones.

SUMMARY OF THE INVENTION

The invention solves this object in that the forming device comprises at least one heating chamber that receives the support and in that at least one heating device interacts with the heating chamber and emits a directable heating air flow in the area of at least one convection heating device.

Further advantageous embodiments can be taken from the dependent claims.

Based on known forming devices for forming thermoformable semi-finished products that are provided in the area of a machine frame with a heatable drawer, secured on the machine frame and providing a support for semi-finished products to be preheated, the forming device according to the invention in the area of its movable support is provided with a heating chamber in which optimizable heating conditions can be generated. For this purpose, it is provided that the heating chamber of this forming device is combined with at least one heating device which generates a directable heating air flow and conveys the heating air flow to at least one heating zone of the heating chamber.

In an expedient embodiment, the horizontally arranged support in the area of the heating chamber can be positioned in variably selectable installation positions wherein preferably at least one upper partial chamber and at least one lower partial chamber are formed. For generating a substantially freely directable heating air flow, at least one convection heating device as a heating device is associated with these two partial chambers. Accordingly, in the area of the completely closable heating chamber a functional unit is provided which can be used energy-efficiently by utilization of the heating air flow that can be generated also with a turbulent orientation. In particular, in the heating phase an efficient heating air circuit is enabled so that, with convection temperatures that can be selected specifically in accordance with the workpiece, the semi-finished product located on the support can be completely and uniformly heated. This support is preferably designed as a drawer or a comparable support structure.

The semi-finished products which are to be heated for further processing in the forming apparatus advantageously integrated into the system are positioned above the support that forms a variable supporting surface in such a way that in this area the heating air flow which is flowing into the heating chamber heats this partial chamber accordingly. It is understood that in this context the at least one heating air flow may comprise at least one flow direction directable in transverse and/or lengthwise to a longitudinal center plane defined by the support. Also, it is conceivable that the flow direction is deflected at least partially by guiding elements and imparted with a turbulent component or swirl component.

In an advantageous embodiment, by means of the two partial chambers, comprising an appropriate flow connection, a targeted circulating heating air flow is realized wherein, in the area of the at least one convection heating device, a flow direction which is perpendicular or parallel to the supporting surface of the support can be predetermined. A further embodiment provides that the heating chamber can also be divided into more than two partial heating chambers heatable by the at least one convection heating device.

An optimal embodiment of the machine frame that receives the combination of forming apparatus and heating chamber provides that in the machine frame area the at least one convection heating device, oriented into a respective partial chamber, is connectable selectively to one or more of the partial chambers. In this context, the system as a whole can be of a modular design such that all components, including the convection heating device, are connected detachably to the machine frame. In this way, assembly or separation of component groups in variable numbers and positions is conceivable.

An optimal positioning of the at least one convection heating device provides that the at least one convection heating device is positioned on an outer edge of the machine frame, wherein the outer edge is parallel to the longitudinal center plane of the forming device. In this way, in a preferred embodiment a structure for convection flow introduction is provided in which, in the area of the drawer, a heating air flow is defined in a direction transverse to the longitudinal center plane of the drawer; this longitudinal center plane is extending in the movement direction of the drawer.

Based on the situation that the at least one convection heating device introduces the heating air flow preferably in the area of the upper partial chamber, the design of the heating chamber provides that, by forming appropriate feeding channels and return channels in the area of the outer edges of the chamber, already with one convection heating device an optimal convection flow in the form of a heating circuit can be generated. The heating air flow which is originating from the at least one convection heating device is therefore variably directable as a circulating heating air flow. This circulating air flow can be relocated below, above and/or within respective components forming the upper supporting surface of the drawer for supporting the semi-finished products. In this context, it is conceivable that, in regard to the flow direction, the heating circuit that heats the semi-finished products is switchable by appropriate adjustment of the convection heating device or can be operated in opposite direction.

A structure in the area of the heating chamber which has been found to be optimal based on tests of prototypes of the forming device provides that in the area of its two side faces adjoining the machine frame, respectively, at least one of the convection heating devices opening into the respective partial chamber is provided, respectively. It is also conceivable that several heating devices are arranged adjacent to each other or that additional guiding channels are provided in the area of the transverse sidewalls.

The two convection heating devices which are to be arranged on both side faces of the heating chamber so as to be almost mirror-symmetrical are constructively matched to each other such that a complex heating unit is formed even for heating chambers that are variable in size. The two convection heating devices comprise respective feeding channels for the conveyed air to be heated in the area of the at least one heating element, wherein the feeding channels open into the respective partial chambers below and above the drawer vertically displaced relative to each other in relation to the upper supporting surface of the support. In this context, by means of respectively adjustable outlet guide channels a respective flow direction into the partial chambers is predetermined. From the partial chambers, the heating air flow which is guided in a circuit is sucked in by respective return channels and returned into the area of the heating elements of the convection heating devices. Accordingly, in the heating chamber a transverse flow is designed such that an efficient heating of the semi-finished products is achieved with minimal heat losses.

The construction according to the invention comprises advantageously convection heating elements with transverse flow turbines which form a heating circuit. The heating circuit extends in this context above and below the support in the partial chambers so that an air flow parallel to the transverse plane of the support is effective, respectively.

For a uniform and energy-saving heating process it is provided that the two convection heating devices in the area of the guide channels generate a uniformly distributed heating air flow and, in this context, a continuously circulating circulation direction is generated.

The afore described system can be improved in the area of the drawer forming the support in that the components forming the supporting surface are provided with a hole structure that is air-permeable at least partially in vertical direction. In this way, with minimal expenditure a vertical flow component between the two partial chambers is enabled.

For an energy-saving preheating process according to the invention it is provided that the heating chamber in the area of its lateral opening, required for displacement of the support into the respective exterior operating position, comprises closing elements in the form of pivoting plates or similar sealing elements which are also closing off at least partially the lateral opening in the open position of the drawer. A further embodiment of the system provides that the heating air flow which is guided in circulation can be supplied at least partially with fresh air.

Based on the special configuration of the forming device, comprising a combination of the heating chamber according to the invention and the forming apparatus arranged above, a further embodiment of the system provides that the machine frame with the heating chamber heatable by the at least one convection heating device is also usable as an independent (autarkic) component in which then, independent of the special forming apparatus, thermoformable semi-finished products are preheated.

Further details and advantageous embodiments of the invention can be taken from the following description and the drawing in which an embodiment of the forming device according to the invention with heating chamber is illustrated in more detail.

DESCRIPTION OF THE PREFERRED EMBODIMENTS

Figure 1:
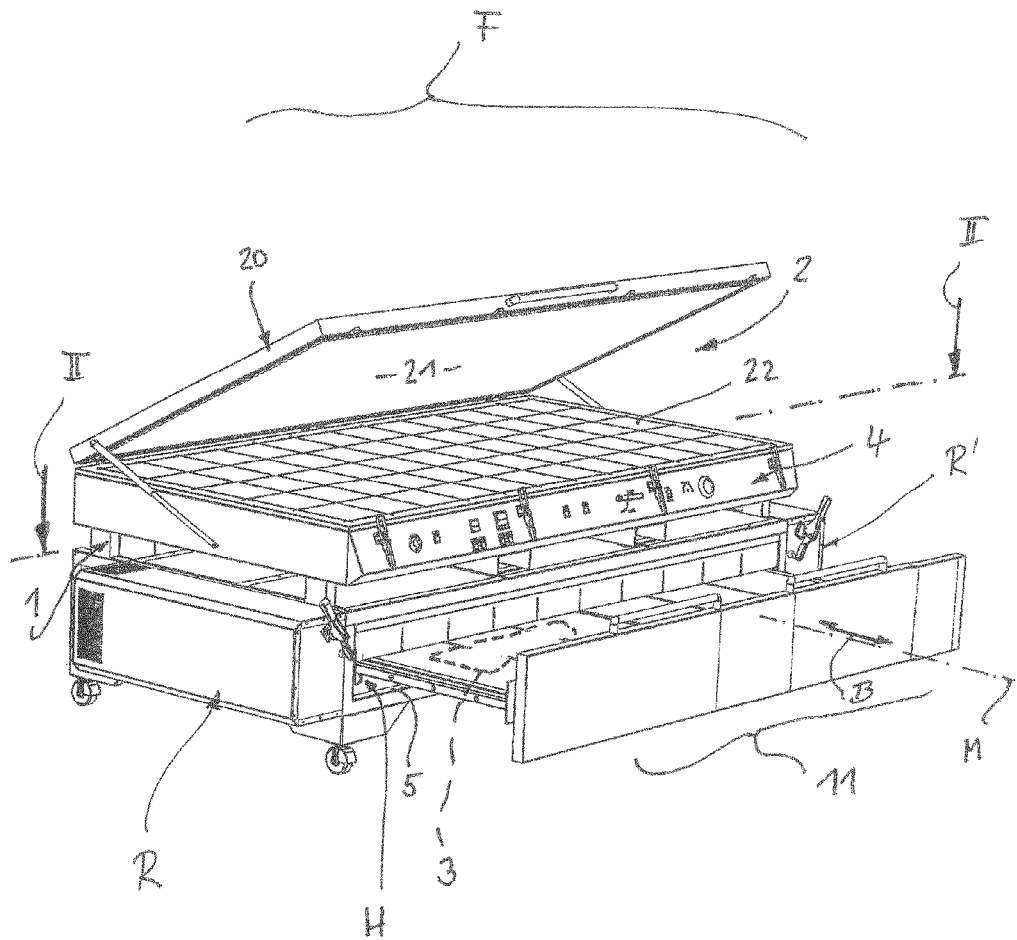
FIG. 1 is a perspective overview of the forming device with a support embodied as a drawer and moved out of the heating chamber.

A forming device for thermoforming of components is illustrated in FIG. 1 and identified as a whole in FIG. 1 by reference character F. These components are in particular thermoformable semi-finished products 3, in particular in the form of plate-shaped or panel-shaped plastic materials, mineral materials or the like, that are configured such that bathtubs, shower bases, kitchen sinks, bathroom sinks, vanities, cover panels, face plates, furniture parts, counter tops, or similar products can be produced in the area of forming apparatus 2. For this purpose, in the illustrated embodiment the forming device F in the area of a machine frame 1 has a forming apparatus 2 positioned at the top and embodied preferably in the form of a vacuum press with an appropriate control system 4. In the area of the pivotable membrane frame 20 an elastic membrane 21 is provided which, in the position of use, is stretched across workpieces (not illustrated) that are positioned on the table 22.

In these known combination devices, a heatable drawer as a support 11 is associated with this machine frame 1 and is used for preheating semi-finished products 3 in the position of use inside the frame 1. From this position of use (not illustrated), the support 11 is moved for removal of the preheated semi-finished products 3 into the accessible removal position (illustrated in FIG. 1) in which the support 11 is at least partially located outside of the machine frame 1. Subsequently, a further processing of the preheated semi-finished products 3 in the area of the upper forming apparatus 2 is carried out.

The inventively improved concept of the forming device F provides that the forming device F is provided with at least one heating chamber H that receives the movable support 11, wherein in the heating chamber H substantially a heating device of any type of construction can be provided.

Advantageously, at least one heating device R or R' (FIG. 7) is interacting with this special heating chamber H and emits a directable heating air flow (arrow S, S'). Based on the support 11 which is arranged in the area of the heating chamber H substantially horizontally and which is embodied variably as a carrier for the semi-finished products 3, an optimal configuration of this heating chamber flow system is provided when an upper partial chamber 10 and a lower partial chamber 10' are formed in the one-part heating chamber H.

It is also conceivable in this context that the support 11 is arranged proximal to bottom 5 of the heating chamber H and thus partial chambers 10 and 10' are defined having a size in accordance with the spacing (arrow L, L', FIG. 7) to the horizontal transverse plane Q of the support 11. The correspondingly small lower partial chamber 10' could then be excluded from a direct effect of the heating air flow S' (not illustrated).

For optimally influencing the prescribed heating process in the area of the semi-finished products 3 by means of the heating air flow S, S', it is provided that the at least one heating device R, R', that can be realized by any technical construction, is preferably embodied in the form of a convection heating device 8, 9. With the arrangement of the convection heating device 8, 9 it is achieved that the at least one heating air flow S, S' at least partially can be introduced in definable directions into the heating chamber H above the semi-finished product 3 located on a supporting surface 11' of the support 11.

Figure 4:
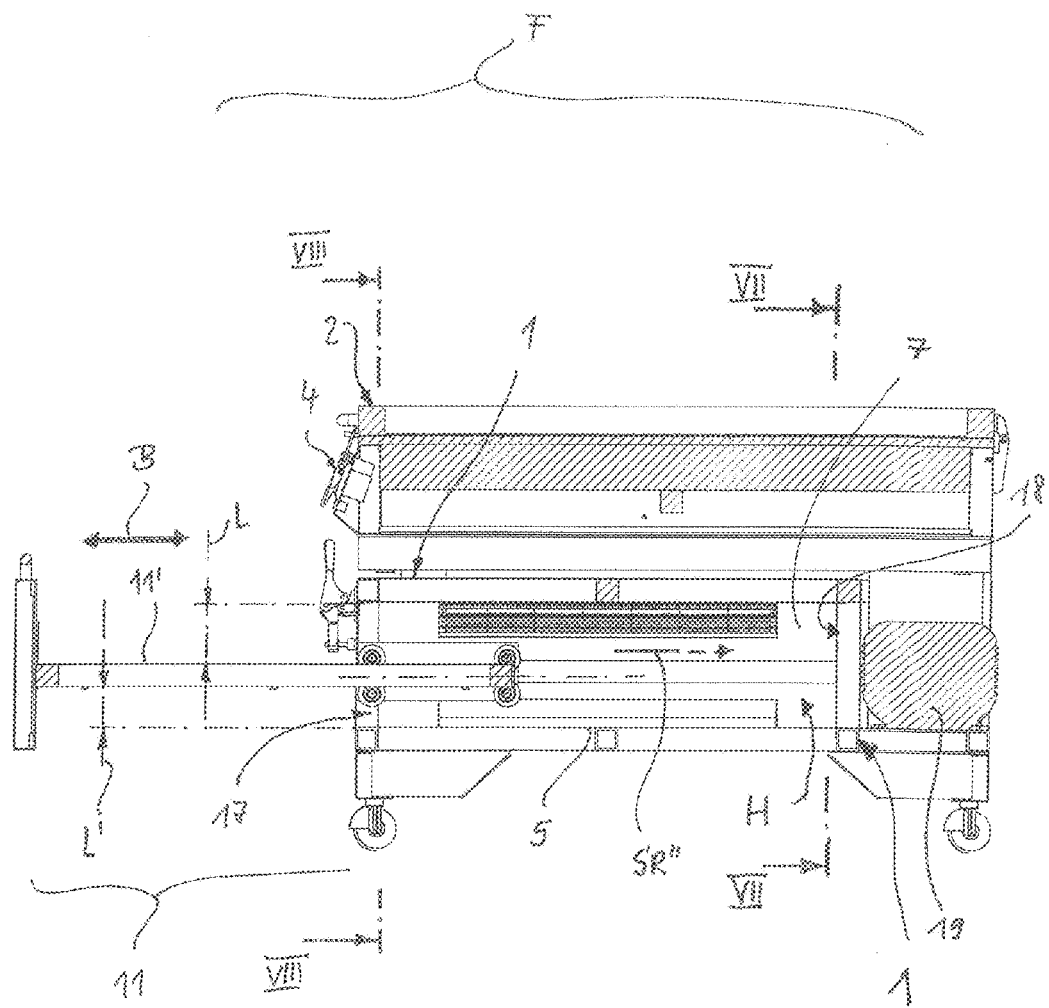
FIG. 4 is a section illustration of the forming device according to section line IV-IV of FIG. 3.
Figure 7:
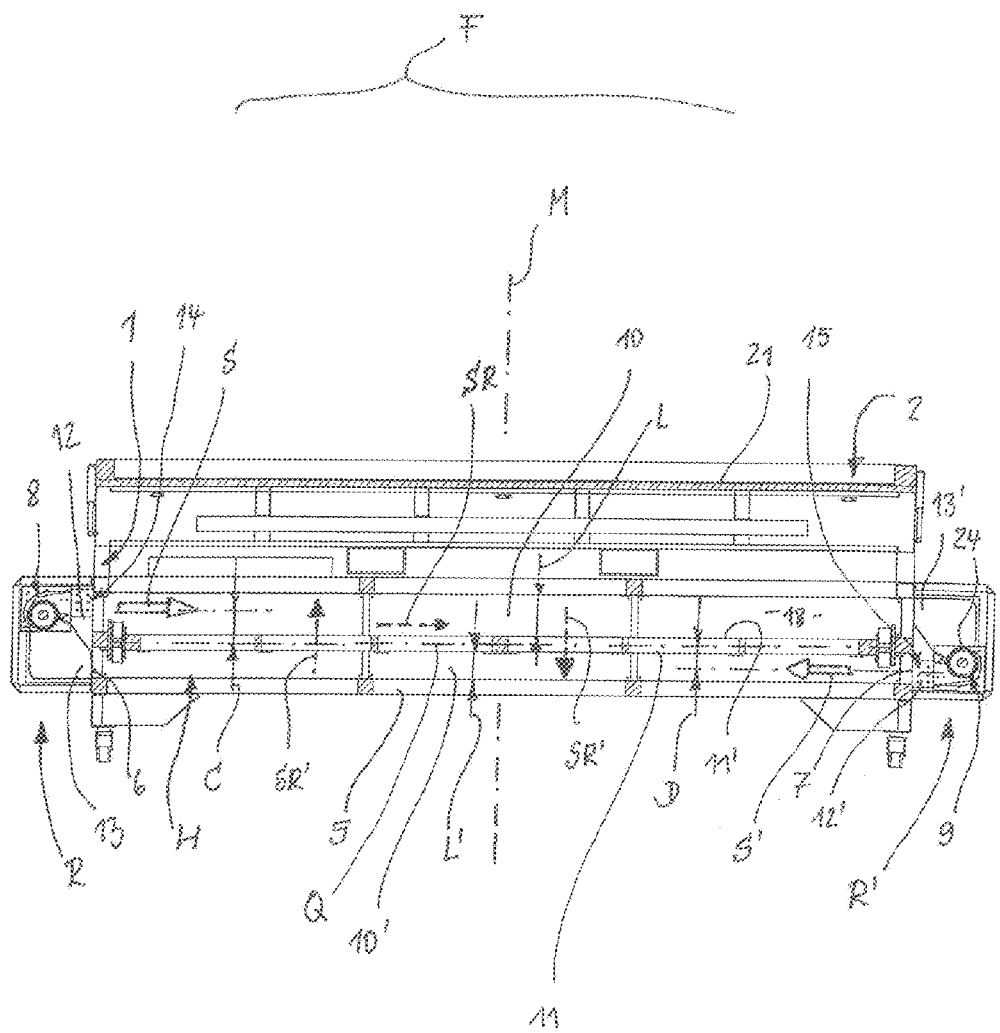
FIG. 7 is a front view of a multi-part forming device according to section line VII-VII of FIG. 4.

The system according to the invention is based in principle on the concept that the at least one heating air flow S, S' can have at least one flow direction that can be directed transverse and/or lengthwise to a longitudinal center plane M that is defined by the movement direction B of the support 11. Based on the two primary heating air flows according to arrows S, S', an arrangement of the at least one convection heating device 8, 9 is conceivable with which a flow direction SR, SR', SR" can be achieved that can be oriented perpendicular or parallel to the supporting surface 11' of the support 11 (FIG. 7, FIG. 4).

Figure 2:
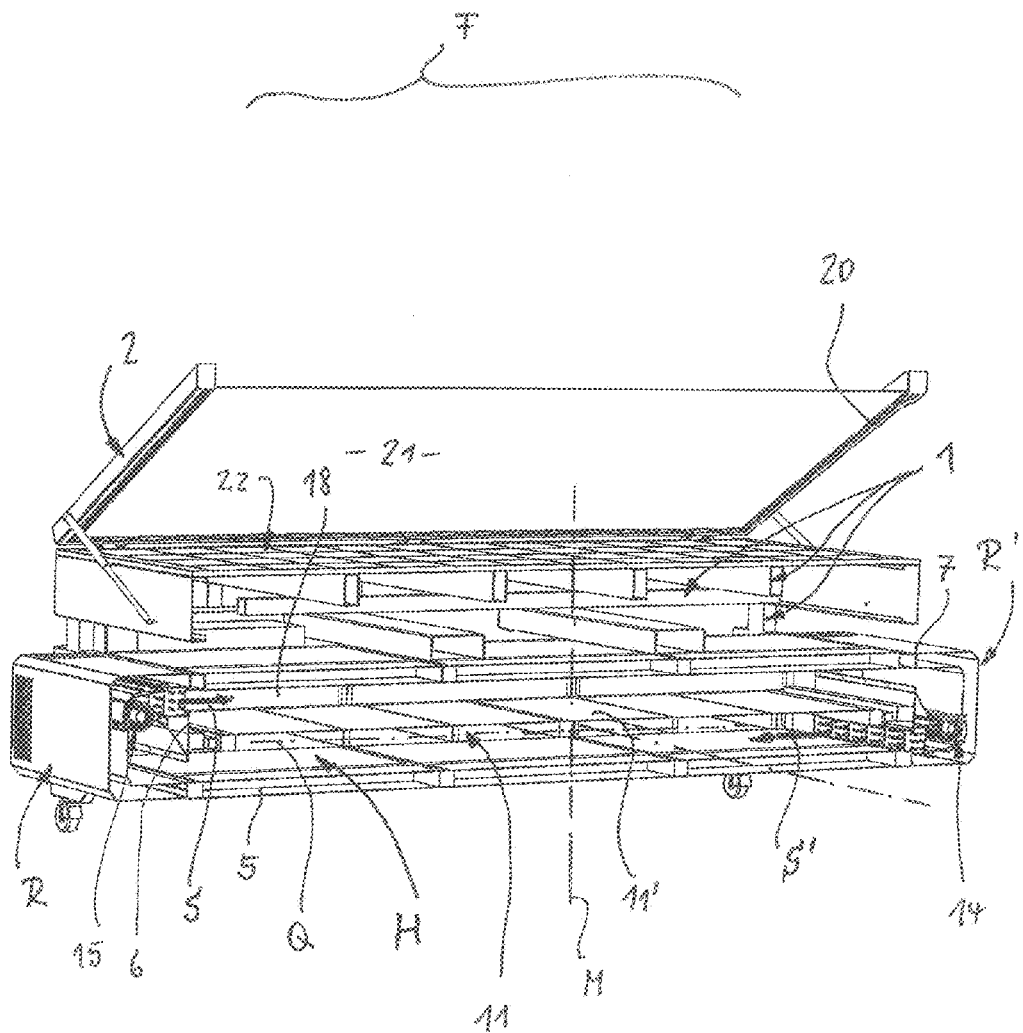
FIG. 2 is a perspective illustration similar to FIG. 1 along section line II-II.

The section illustration according to FIG. 2 illustrates the central position of the support 11 that defines a transverse plane Q. Based on this, an optimal air guiding action of the heating circuit can be derived whose heating air flows S, S' can be directed in circulation parallel to transverse plane Q below and above the support 11 by means of the convection heating elements 8, 9, provided with transverse flow turbines.

A constructive development of the forming device F in the area of the heating chamber H provides that it can be embodied so as to be divided into more than the two illustrated partial chambers 10, 10' that are heatable by the at least one convection heating device 8, 9. In this context, it is also conceivable that the at least one convection heating device 8, 9 oriented toward the partial chambers 10, 10' is connectable selectively to the system. In this context, a modular configuration of the system of machine frame 1 and heating chamber H is conceivable wherein the convection heating device 8, 9, also designed as a module, can be separated or connected to the machine frame 1. In this context, the heating air guiding action provides that heating of the respective partial chambers 10, 10' is also selectively possible completely or partially. In this context, appropriate guide flaps (not illustrated) for regulating the flow directions can be used.

Based on the concept that heating of the heating chamber H or its partial chambers 10, 10' is in principle realizable from any lateral area of the chamber H that is closed on three sides, the construction according to the invention provides that the at least one convection heating device 8, 9 is arranged on at least one outer edge 6, 7 of the machine frame 1 that is parallel to the longitudinal center plane M. In this context, preferably the at least one transverse direction SR (FIG. 7) is defined for the heating air flow S, S' provided in the area of the support 11.

It is understood that, for realizing an optimal heating circuit S, S' of the heated convection air, the at least one convection heating device 8, 9 is provided respectively with at least one feeding channel 12, 12' that opens into the upper or lower partial chamber 10, 10' as well as an appropriate outflow return channel 13, 13'.

The constructively optimal realization of this basic air circulation principle provides that in the area of the outer edges 6, 7 of the machine frame 1 or in the area of the parallel side faces of the heating chamber H, one of the convection heating devices 8 or 9 is arranged respectively and opens into the respective partial chamber 10, 10'.

Figure 8:
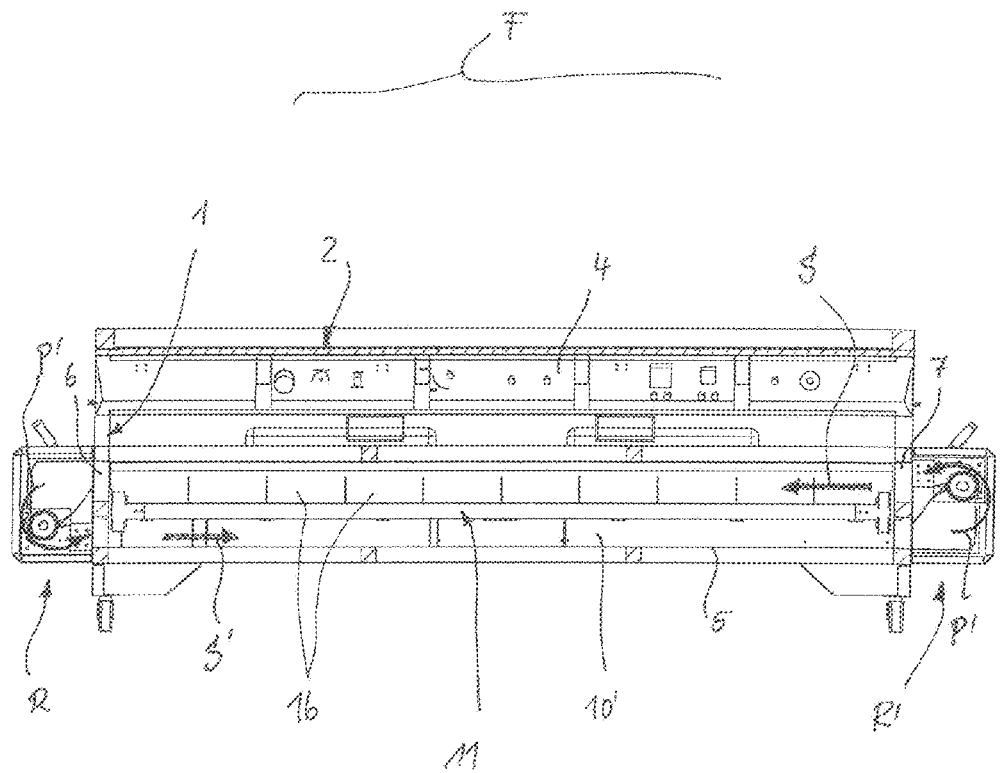
FIG. 8 is a sectioned front view according to section line VIII-VIII of FIG. 4.

From the illustrations according to FIG. 7 and FIG. 8 it is apparent that the two convection heating devices 8, 9, relative to the supporting surface 11' or transverse plane Q, have feeding channels 12, 12' that are arranged vertically displaced relative to each other below and above the support 11. In this context, it is apparent that the respective heating elements, generally identified by 14 and 15, are provided in the area of the feeding channels 12, 12' (FIG. 5, FIG. 6) that are exiting from the convection heating devices 8, 9 for generating the oriented heating air flows S, S'.

In accordance with this construction of feeding and return guiding action in the form of a circuit with guide channels 12, 12', 13, 13', the respective flow directions SR, SR', SR" are predetermined so that the heating air flow S, S' that is guided substantially in circulation is supplied again to the heating elements 14, 15 in the area of the respective return channels 13, 13' as sucked-in air. Accordingly, advantageously a continuously circulating air circulation direction can be achieved in the novel heating chamber H.

Figure 3:
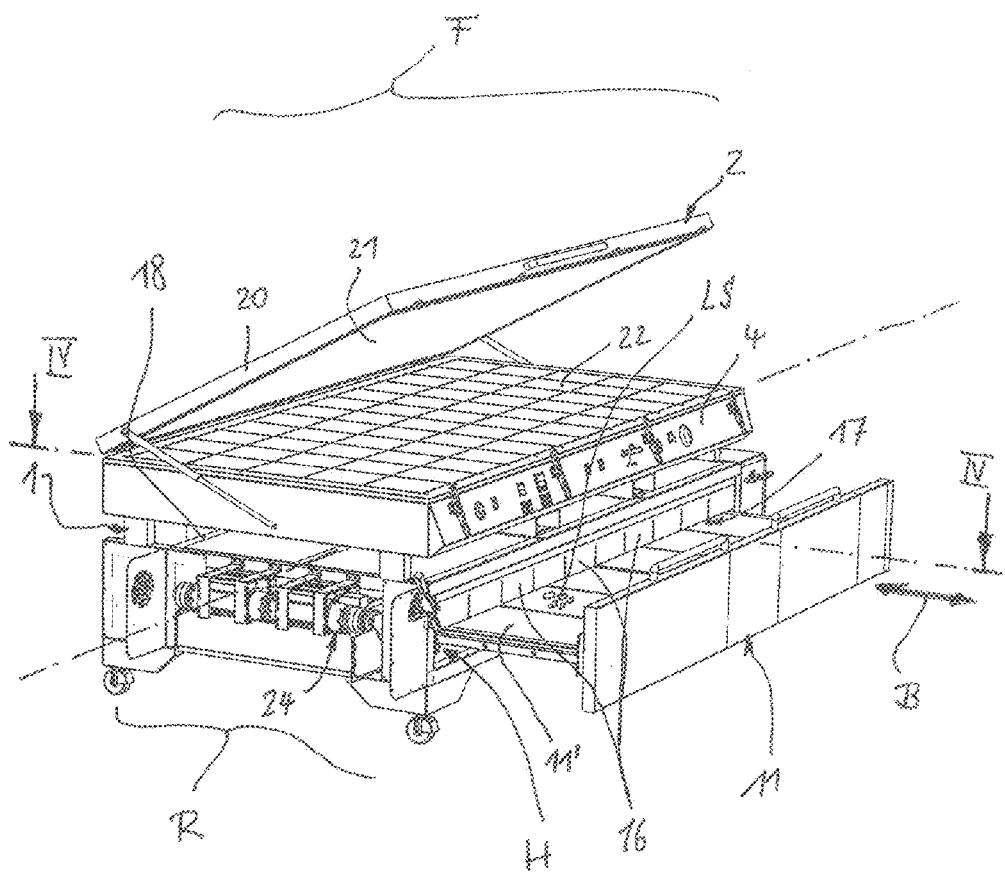
FIG. 3 is a perspective illustration similar to FIG. 1 showing the heating chamber at the side in an open position.
Figure 5:
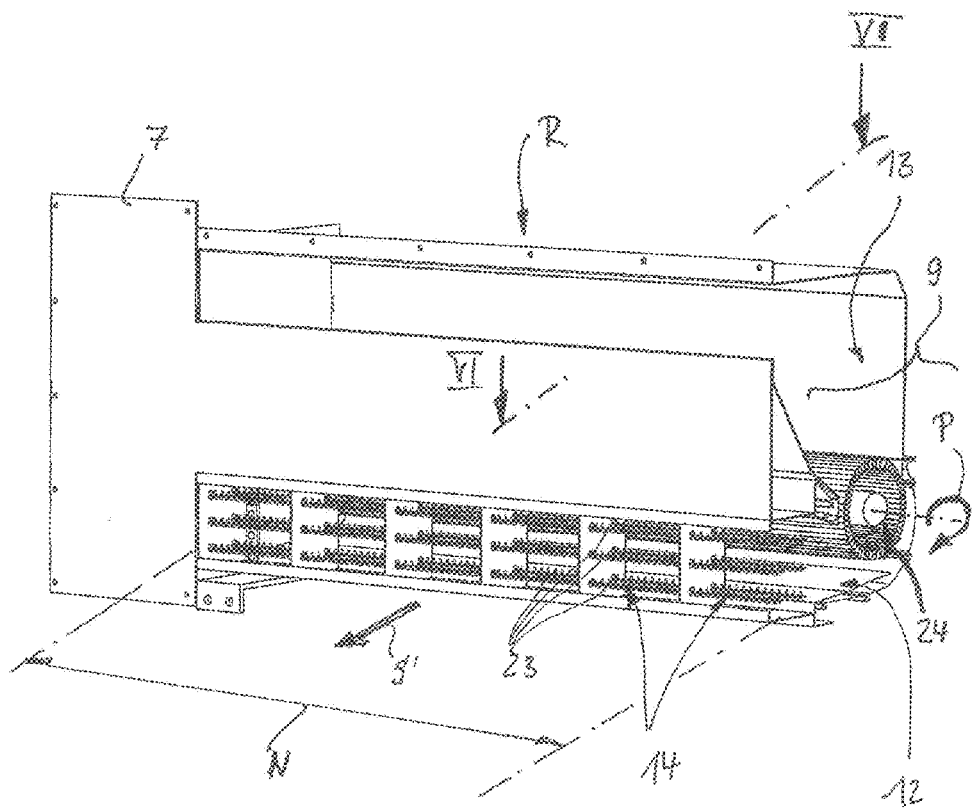
FIG. 5 is a detail illustration of a convection heating device provided in the area of the heating chamber.
Figure 6:
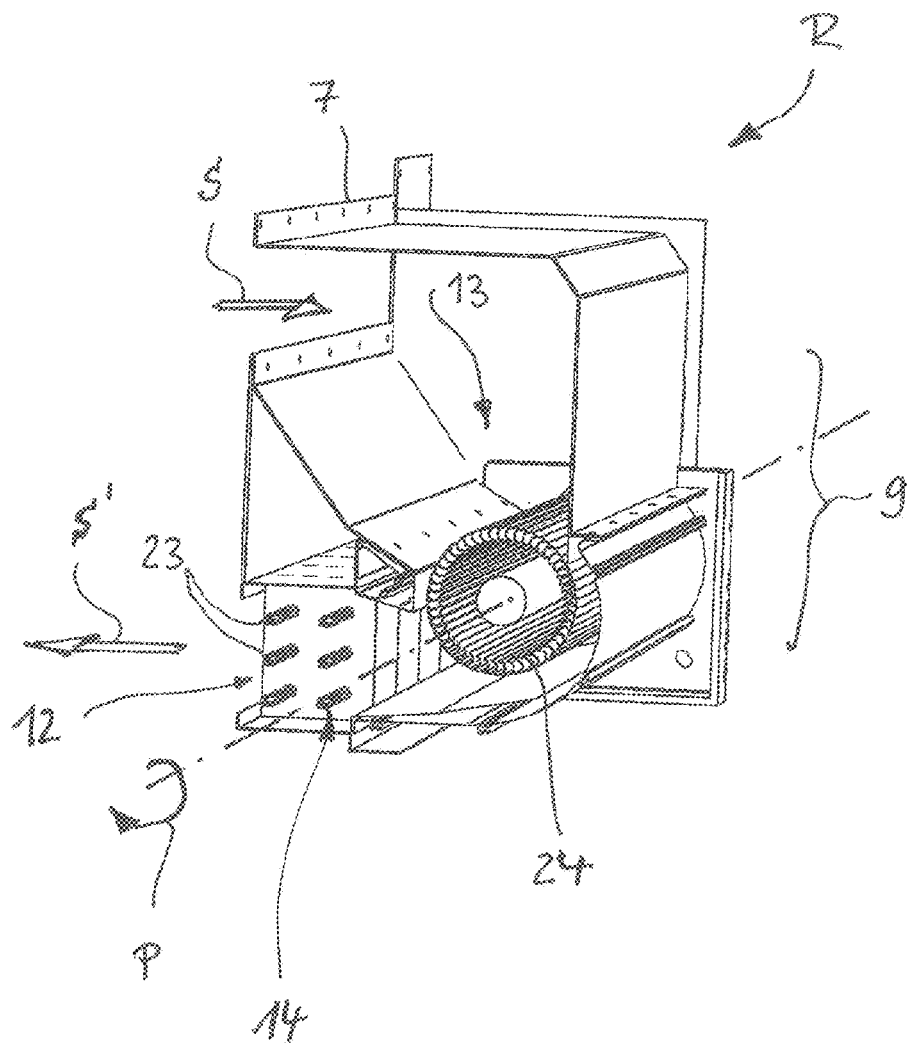
FIG. 6 is a front view with section illustration according to section line VI-VI of FIG. 5.

From the illustrations of FIG. 5 and FIG. 6 in combination with FIG. 3 an embodiment of the heating device R with heating elements 14 in the form of heating wires or coils 23 is apparent. The latter are arranged in several planes across a length N such that an air flow which is guided into the feeding channels 12 and controllable by a blower 24 is heated and blown in flow direction S' (FIG. 6) into the heating chamber H. With the rotational direction P of the blower 24 a circulating air movement of the heating air flow S, S' can be activated. In the embodiment according to FIG. 8, the system is embodied with rotational direction P' of the blower.

A further embodiment of the system provides that the support 11 in the area of its supporting surface 11' is provided with a hole structure LS that is permeable at least partially in vertical direction SR'. The process control can also be designed such (not illustrated) that fresh air can be supplied to the heating air flow S, S', preferably guided in circulation, at least in a partial area of the heating chamber H.

From the section illustration of FIG. 4 and the illustration of the partially open heating chamber of FIG. 3, the closed configuration of the heating chamber H, provided with a closed back wall 18 opposite the loading opening 17 that is partially provided with elastic closing plates 16, is apparent. On the machine frame 1 auxiliary devices 19 are supported (FIG. 4) behind the back wall 18.

Based on the afore described system of the forming device F according to the invention, it is provided that this modularly embodied forming device F can also be used without the forming apparatus 2 that is integrated into the machine frame 1 as an independent (autarkic) component (not illustrated) with a heating chamber H that can be heated by at least one convection heating device 8, 9.

The specification incorporates by reference the entire disclosure of German priority document 10 2015 112 641.9 having a filing date of Jul. 7, 2015.

While specific embodiments of the invention have been shown and described in detail to illustrate the inventive principles, it will be understood that the invention may be embodied otherwise without departing from such principles.

What is claimed is:

1. A forming device comprising:
a machine frame;
a forming apparatus disposed on the machine frame;
at least one heating chamber disposed on the machine frame;
a heatable support received in the at least one heating chamber in a position of use for preheating semi-finished products and configured to be moved in a movement direction out of the at least one heating chamber into a removal position for removal of preheated semi-finished products from the support, wherein the support in the removal position is at least partially located adjacent to the machine frame and enables access to preheated semi-finished products;
at least one heating device associated with the at least one heating chamber and comprising one or more convection heating devices configured to discharge at least one directable heating air flow;
wherein the support is substantially horizontally arranged in the at least one heating chamber and separates the at least one heating chamber into at least one upper partial chamber above the support and at least one lower partial chamber below the support, wherein the one or more convection heating devices communicate with the at least one upper partial chamber and the at least one lower partial chamber;
wherein the one or more convection heating devices each comprise at least one feeding channel and at least one return channel, wherein:

the at least one feeding channel opens into the at least one upper partial chamber and the at least one return channel is connected to the at least one lower partial chamber; or
the at least one feeding channel opens into the at least one lower partial chamber and the at least one return channel is connected to the at least one upper partial chamber;
wherein the at least one heating air flow discharged from the one or more convection heating devices moves as a circulating heating air flow as a heating circuit in a first direction below and in a second direction, opposite to the first direction, above the support such that a semi-finished product resting on the support is heated by the heating circuit.

2. The forming device according to claim 1, wherein the one or more convection heating devices include a first convection heating device and a second convection heating device, wherein the at least one heating chamber has a first side face and a second side face opposite the first side face, wherein the first and second side faces adjoin the machine frame, wherein the first convection heating device is arranged on the first side face and the second convection heating device is arranged on the second side face.

3. The forming device according to claim 2, wherein the first convection heating device comprises a first feeding channel and the second convection heating device comprises a second feeding channel, wherein the first feeding channel opens below a supporting surface of the support into the at least one lower partial chamber and the second feeding channel opens above the supporting surface of the support into the at least one upper partial chamber, wherein the first and second feeding channels are guide channels that predetermine a flow direction, wherein the first and second convection heating devices comprise return channels, and wherein the at least one heating air flow is flowing in circulation through the first and second feeding channels and the return channels.

4. The forming device according to claim 3, wherein the first and second convection heating devices comprise transverse flow turbines that produce in the area of the guide channels a heating air flow with a continuous circulation direction.

5. The forming device according to claim 1, wherein the at least one heating air flow is introduced at least partially above a semi-finished product located on a supporting surface of the support into the at least one heating chamber and the at least one heating air flow comprises at least one flow direction oriented transverse and/or lengthwise to a longitudinal center plane that is defined by the movement direction of the support.

6. The forming device according to claim 1, wherein the at least one heating air flow of the one or more convection heating devices comprises a flow direction oriented perpendicular to or parallel to a supporting surface of the support.

7. The forming device according to claim 1, wherein the at least one heating chamber is divided into more than two partial chambers heated by the one or more convection heating devices.

8. The forming device according to claim 7, wherein the one or more convection heating devices are selectively connectable to or separable from one or more of the partial chambers.

9. The forming device according to claim 1, wherein the machine frame comprises an outer edge or a side face that is parallel to a longitudinal center plane of the support defined by the movement direction of the support, wherein the one or more convection heating devices are arranged on the outer edge or the side face of the machine frame so that, in the area of the support, the at least one heating air flow flows at least in a transverse direction relative to the longitudinal center plane.

10. The forming device according to claim 1, wherein the support comprises a supporting surface provided with a hole structure that is at least partially air-permeable in a vertical direction.

11. The forming device according to claim 1, wherein the at least one heating air flow is guided in circulation and is supplied at least partially with fresh air.

12. The forming device according to claim 1, wherein the forming apparatus is a vacuum membrane press.

13. The forming device according to claim 1, wherein the support is a movable drawer.

14. A forming device comprising:
a machine frame;
a forming apparatus disposed on the machine frame;
at least one heating chamber disposed on the machine frame;
a heatable support received in the at least one heating chamber in a position of use for preheating semi-finished products and configured to be moved in a movement direction out of the at least one heating chamber into a removal position for removal of preheated semi-finished products from the support, wherein the support in the removal position is at least partially located adjacent to the machine frame and enables access to preheated semi-finished products;
at least one heating device associated with the at least one heating chamber and comprising one or more convection heating devices configured to discharge at least one directable heating air flow;
wherein the support is substantially horizontally arranged in the at least one heating chamber and separates the at least one heating chamber into at least one upper partial chamber above the support and at least one lower partial chamber below the support, wherein the one or more convection heating devices communicate with the at least one upper partial chamber and the at least one lower partial chamber;
wherein the one or more convection heating devices include a first convection heating device and a second convection heating device;
wherein the at least one heating chamber has a first side face and a second side face opposite the first side face, wherein the first and second side faces adjoin the machine frame;
wherein the first convection heating device is arranged on the first side face and the second convection heating device is arranged on the second side face;
wherein the first convection heating device comprises a first feeding channel and a first return channel, wherein the second convection heating device comprises a second feeding channel and a second return channel;
wherein the first feeding channel opens below a supporting surface of the support into the at least one lower partial chamber and the first return channel is connected to the at least one upper partial chamber;
wherein the second feeding channel opens above the supporting surface of the support into the at least one upper partial chamber and the second return channel is connected to the at least one lower partial chamber;
wherein the first and second feeding channels are guide channels that predetermine a flow direction;
wherein the at least one heating air flow flows in circulation through the first and second convection heating devices from the first feeding channel to the second return channel and from the second feeding channel to the first return channel.

\* \* \* \* \*